(12) United States Patent
Tambi et al.

(10) Patent No.: US 11,645,478 B2
(45) Date of Patent: May 9, 2023

(54) MULTI-LINGUAL TAGGING FOR DIGITAL IMAGES

(71) Applicant: Adobe Inc., San Jose, CA (US)

(72) Inventors: Ritiz Tambi, San Jose, CA (US); Pranav Aggarwal, San Jose, CA (US); Ajinkya Kale, San Jose, CA (US)

(73) Assignee: Adobe Inc., San Jose, CA (US)

( * ) Notice: Subject to any disclaimer, the term of this patent is extended or adjusted under 35 U.S.C. 154(b) by 122 days.

(21) Appl. No.: 17/088,847

(22) Filed: Nov. 4, 2020

(65) Prior Publication Data

US 2022/0138439 A1 May 5, 2022

(51) Int. Cl.
*G06F 40/58* (2020.01)
*G06F 40/117* (2020.01)

(52) U.S. Cl.
CPC ............ *G06F 40/58* (2020.01); *G06F 40/117* (2020.01)

(58) Field of Classification Search
CPC ............................... G06F 40/58; G06F 40/117
See application file for complete search history.

(56) References Cited

U.S. PATENT DOCUMENTS

| | | | | |
|---|---|---|---|---|
| 7,882,124 B2* | 2/2011 | Slaney | ................ | G06F 16/5866 707/765 |
| 8,001,139 B2* | 8/2011 | Slaney | ................ | G06F 16/5866 707/765 |
| 8,538,957 B1* | 9/2013 | Zhou | ........................ | G06F 40/51 707/760 |
| 9,183,227 B2* | 11/2015 | Clinchant | ............ | G06F 16/5838 |
| 10,298,522 B2* | 5/2019 | Yim | ........................ | H04W 4/14 |
| 10,319,019 B2* | 6/2019 | Hewavitharana | ...... | G06N 20/00 |
| 10,515,292 B2* | 12/2019 | Harwath | ................ | G06V 10/82 |
| 10,878,195 B2* | 12/2020 | Duta | .................... | G06V 30/412 |
| 10,943,096 B2* | 3/2021 | Yi | ........................ | G06K 9/6262 |
| 11,295,733 B2* | 4/2022 | Park | ........................ | G06F 40/51 |
| 2009/0160860 A1* | 6/2009 | Slaney | ................ | G06F 16/5866 345/440 |
| 2009/0164456 A1* | 6/2009 | Slaney | ................ | G06F 16/5866 707/999.005 |

(Continued)

FOREIGN PATENT DOCUMENTS

CN 111723585 A * 9/2020
WO WO-2022073417 A1 * 4/2022

OTHER PUBLICATIONS

Sah, Shagan & Gopalakishnan, Sabarish & Ptucha, Raymond. (Mar. 25, 2020). Aligned attention for common multimodal embeddings. Journal of Electronic Imaging. 22 pages. 29. 1. 10.1117/1.JEI.29.2.023013. (Year: 2020).*

(Continued)

*Primary Examiner* — Benjamin Smith
(74) *Attorney, Agent, or Firm* — Keller Preece PLLC

(57) ABSTRACT

Introduced here is an approach to translating tags assigned to digital images. As an example, embeddings may be extracted from a tag to be translated and the digital image with which the tag is associated by a multimodal model. These embeddings can be compared to embeddings extracted from a set of target tags associated with a target language by the multimodal model. Such an approach allows similarity to be established along two dimensions, which ensures the obstacles associated with direct translation can be avoided.

20 Claims, 13 Drawing Sheets

(56) References Cited

U.S. PATENT DOCUMENTS

| | | | |
|---|---|---|---|
| 2010/0082615 A1* | 4/2010 | Clinchant | G06F 16/58 |
| | | | 707/E17.046 |
| 2017/0293611 A1* | 10/2017 | Tu | G06F 16/48 |
| 2018/0039859 A1* | 2/2018 | Harwath | G06V 10/82 |
| 2018/0075508 A1* | 3/2018 | Hewavitharana | G06Q 30/0601 |
| 2018/0295072 A1* | 10/2018 | Yim | G06T 11/60 |
| 2019/0205620 A1* | 7/2019 | Yi | G06V 10/454 |
| 2019/0340240 A1* | 11/2019 | Duta | G06V 30/15 |
| 2021/0090557 A1* | 3/2021 | Park | G06F 40/40 |
| 2021/0279427 A1* | 9/2021 | Malik | G06F 40/58 |
| 2022/0156488 A1* | 5/2022 | Mokhtari | G06N 20/00 |
| 2022/0180864 A1* | 6/2022 | Park | G10L 15/22 |
| 2022/0237391 A1* | 7/2022 | Zhang | G06F 40/284 |

OTHER PUBLICATIONS

Sah, Shagan & Gopalakishnan, Sabarish & Ptucha, Raymond. (Mar. 25, 2020). Aligned attention for common multimodal embeddings. Journal of Electronic Imaging. 22 pages. https://doi.org/10.1117/1.JEI.29.2.023013 (Year: 2020).*

Qi, J., Huang, X. & Peng, Y. Cross-media similarity metric learning with unified deep networks. Multimed Tools Appl 76, 25109-25127 (May 6, 2017). https://doi.org/10.1007/s11042-017-4726-6 (Year: 2017).*

* cited by examiner

| Digital Image | Source Tags | Machine Translation | Multimodal Approach |
|---|---|---|---|
| 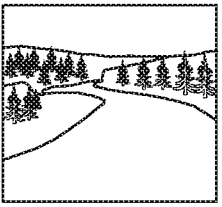 | River, Water, Lanscape, Nature, Lake, Sky, Summer, Green, Forest, Tree, Blue, Park, Reflection, Trees, Grass, Pond, Bridge, Beautiful, Spring, Cloud, Scene, Clouds, Countryside, Outdoor, View, Bank | Rivière, Eau, Paysage, Nature, Lac, Ciel, Été, Vert, Forêt, Arbre, Bleu, Parc, Réflexion, Arbres, Gerbe, Étang, Pont, Beau, Printemps, Nuage, Scène, Nuages, Campagne, Extérieur, Vue, Banque | Rivière, Eau, Paysage, Nature, Lac, Ciel, Été, Verte, Forêt, Arbres, Bleue, Parc, Réflexion, Bord du lac, Gazon, Étang, Pont, Beau, Printemps, Nuage, Lieu, Nuages, Campagne, La vue, Rive |
| 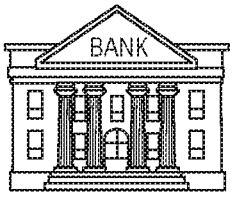 | House, Architecture, Building, Home, Window, Exterior, Old, Roof, Construction, Windows, White, Wall, Residential, Sky, Front, Estate, Structure, Blue, Façade, City, New, Door, Apartment, Property, Isolated, Bank | Maison, Architecture, Bâtiment, Maison, Fenêtre, Extérieur, Ancien, Toit, Construction, Fenêtres, Blanc, Mur, Résidentiel, Ciel, Avant, Immobilier, Structure, Bleu, Façade, Ville, Nouveau, Porte, Appartement, Propriété, Isolé, Banque | Maison, Architecture, Immeubles, Domicile, Fenêtres, Exterieures, Vieille, Toiture, Construction, Façade, Blanc, Murs, Résidentiel, Maison blanche, Avant, Propriété, Structure, Bleue, Façades, Ville, Nouveaux, Portière, Hypothécaire, Immobiliers, Isolée, Banques |
| 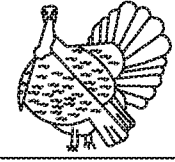 | Turkey, Bird, Animal, Poultry, Wild, Farm, Nature, Red, Grass, Fowl, Chicken, Hen, Wildlife, Food, Feature, Features, Domestic, Black, Tail, Meat, Gobbler, Green | Dinde, Oiseau, Animal, La volaille, Sauvage, Ferme, La nature, Rouge, Herbe, Volaille, Poulet, Poule, Faune, Aliments, Plume, Plumes, National, Noir, Queue, Viande, Gobbler, Vert | Dinde, Oiseau, Animale, Volaille, Sauvage, Ferme, Natures, Rouge, Herbe, Volailles, Poulets, Poule, Faune, Nourriture, Plumes, Domestiques, Noir, Queue, Viande, Gobbler, Verte |

FIGURE 4

| Digital Image | Source Tags | Machine Translation | Multimodal Approach |
|---|---|---|---|
| | Istanbul, Mosque, Turkey, Architecture, Minaret, Religion, Landmark, Blue, Dome, Turkish, Church, Building, City, Travel, Sofia, Ottoman, Old, Religious, Monument, Night | Istanbul, Mosquée, Dinde, Architecture, Minaret, Religion, Point de repère, Bleu, Dôme, Turc, Église, Bâtiment, Ville, Voyage, Sofia, Ottoman, Vieux, Religieux, Moniment, Nuit | Istanbul, Mosque, Turquie, Architecture, Minaret, Religions, Jalon, Bleus, Dôme, Turc, Église, Bâtimen, Ville, Voyage, Sofia, Ottoman, Vieux, Religieux, Monument, Nuit |
| | Spring, Metal, Isolated, White, Spiral, Object, Wire, Steel, Stone, Coil, Silver, Abstract, Equipment, Metallic, Curve, Pressure, Shiny | Printemps, Métal, Isolé, Blanc, Spirale, Objet, Fil, Acier, Pierre, Bobine, Argent, Abstrait, Équipement, Pierres, Métallique, Courbe, Pression, Brillant | Ressort, Métal, Isolé, Blanche, Spirale, Objet, Fil de fer, Acier, Pierre, Bobine, Argent, Abstrail, Matériel, Métallique, Courbe, Pression, Brillant |
| | Tree, Spring, Blossom, Nature, Landscape, Grass, Sky, Pink, Green, Flower, Cherry, Trees, Park, Blue, Garden, Blooming, Bloom, Orchard, Flowers, Field, Plant, Apple, Meadow, White, Outdoor | Arbre, Printemps, Fleur, La nature, Paysage, Herbe, Ciel, Rose, Vert, Fleures, Cerise, Des arbres, Parc, Bleu, Jardin, Épanouissement, Floraison, Verger, Fleurs, Champ, Plante, Pomme, Prairie, Blanc, De plein air | Arbre, Printemps, Fleures, Nature, Paysage, Gazon, Ciel, Rosé, Vert, Fleur, Cerise, Arbres, Parc, Bleue, Jardin, Épanouissement, Floraison, Fleur, Verger, Champ, Plante, Pomme, Fleur du printemps, Blanc, |

FIGURE 4, CONT.

| Digital Image | Source Tags | Machine Translation | Multimodal Approach |
|---|---|---|---|
| 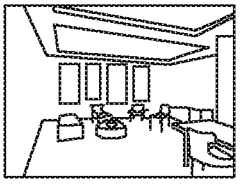 | Flat, Interior, Room, Home, House, Living room, Design, Sofa, Table, Living, Furniture, Chair, Architecture, Luxury, Window, Hotel, Indoors, White, Décor, Floor, Nobody, Lamp, Light, Comfortable, Kitchen | Plate, Intérieur, Chambre, Maison, Maison, Salon, Conception, Canapé, Table, Vivant, Meubles, Chaise, Architecture, Luxe, Fenêtre, Hôtel, À l'intérieur, Blanc, Décor, Sol, Personne, Lampe, Lumière, Confortable, Cuisine | Appartement, Intérieur, Salle, Maison, Maisons, Salon, Conception, Canapé, Table, Vivant, Meubles, Chaise, Architecture, Luxe, Fenêtres, Hôtel, Chez sois, Blanc, Décor, Sol, Personne, Lampe, Lumière, Confortable, Cuisine |
| 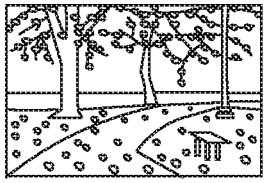 | Fall, Autumn, Park, Tree, Bench, Nature, Leaves, Leaf, Yellow, Landscape, Trees, Season, Forest, Orange, Foliage, Green, Outdoors, Colorful, Maple, Path, Grass, Beautiful, Golden, Red, October, Flat | Tomber, Automne, Parc, Arbre, Banc, Nature, Feuilles, Feuille, Jaune, Paysage, Arbres, Saison, Forêt, Orange, Feuillage, Vert, À l'extérieur, Coloré, Érable, Chemin, Herbe, Belle, D'or, Rouge, Octobre, Plat | L'automne, Automne, Parc, Arbre, Banc, Nature, Jourée, D'Automne, Feuilles, Jaune, Paysage, Arbres, Saison, Forêt, Orange, Feuillage, Verte, Parque, Coloré, Érable, Chemin, Pelouse, Belle, D'or, Rouge, Octobre, Plat |

FIGURE 4, CONT.

MULTI-LINGUAL TAGGING FOR DIGITAL IMAGES

TECHNICAL FIELD

Various embodiments concern computer programs and associated computer-implemented techniques for tagging digital images in multiple languages.

BACKGROUND

The term "tagging" refers to the process by which digital images are labelled based on the objects included in those images. To accomplish this, a digital image can be provided to a computer-implemented model (also referred to as "tagging models" that examines the underlying pixels, discovers relevant features to detect one or more objects of interest, and then identifies appropriate keywords based on those object(s). These keywords may be referred to as "tags" that are associated with the digital image. FIG. 1 includes an example of a digital image for which tags have been produced by a tagging model. This process is normally automated. However, individuals may be asked to supervise or perform some tasks. For instance, an individual may be responsible for identifying objects to be labelled and/or confirming the accuracy of tags output by the computer program.

Automated tagging is a time- and resource-efficient approach to analysis that has increased in popularity as entities have begun utilizing massive amounts of digital images for different tasks. Assume, for example, that an individual uploads a series of digital images to an editing platform (also referred to as an "editing program") through which those digital images can be viewed or manipulated. In such a scenario, the editing platform may process the series of digital images so that each digital image is labelled with appropriate tag(s). When the process is complete, the individual may be able to easily perform tag-based searches of the entire series of digital images.

BRIEF DESCRIPTION OF THE DRAWINGS

FIG. 4 illustrates how the multimodal approach compares to conventional machine translation when translating source tags in English into target tags in French.

Figure 1:
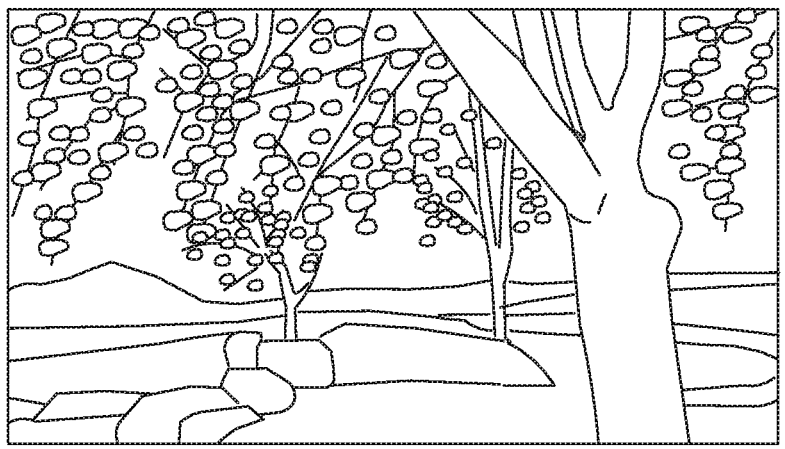
FIG. 1 includes an example of a digital image for which tags have been produced.

Various features of the technologies described herein will become more apparent to those skilled in the art from a study of the Detailed Description in conjunction with the drawings. Embodiments are illustrated by way of example and not limitation in the drawings, in which like references may indicate similar elements. While the drawings depict various embodiments for the purpose of illustration, those skilled in the art will recognize that alternative embodiments may be employed without departing from the principles of the technologies. Accordingly, while specific embodiments are shown in the drawings, the technology is amenable to various modifications.

DETAILED DESCRIPTION

Tagging models have traditionally been designed to output tags in English. There are several reasons for this, one of which is that sufficient data (e.g., in the form of image-tag pairs) for training has only been available in English. However, it has become increasingly clear that there is a need for tags in other languages, especially as the interest in digital images continues to increase across the globe.

There are two conventional approaches to translating tags in English. Some entities have focused on developing algorithms that rely on direct translation. Direct translation (also referred to as "literal translation") involves translating each tag separately without looking at the other tags produced for a digital image for context. Other entities have focused on developing algorithms that can be trained to infer context by considering other tags when translating a given tag. There are obstacles to successfully implementing these conventional approaches, however.

Figure 2:
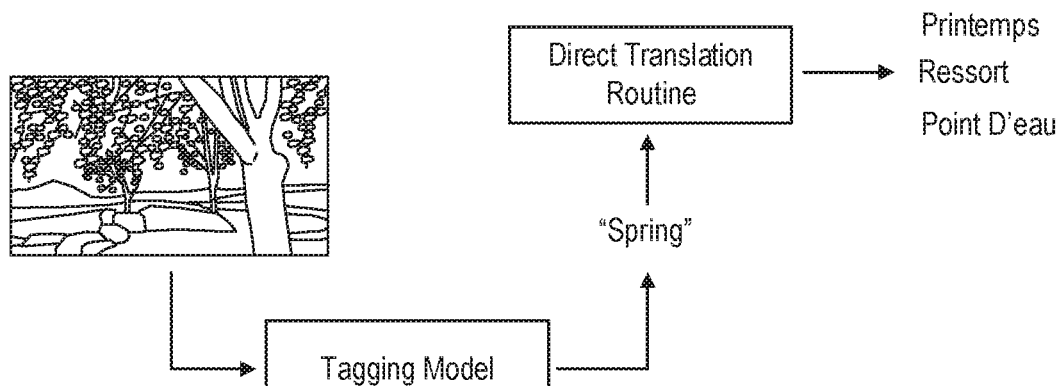
FIG. 2 illustrates how conventional approaches to translation may result in improper translation due to partial or total lack of context.

As mentioned above, there are several tagging models that have been designed to output tags in English. However, direct translation of these tags is prone to significant errors due to ambiguity. Assume, for example, that upon being applied to the digital image, a tagging model outputs the term "spring." This term may be used to refer to (i) the season between winter and summer, (ii) an elastic body that recovers its original shape when released following distortion, and (iii) a source of water that issues from the ground. As such, the proper translation for the term "spring" may depend on which of these meanings is appropriate. In French, for example, the corresponding translations are "printemps," "ressort," and "point d'eau." As shown in FIG. 2, a direct translation routine is bound to result in errors since the necessary context is absent in word-level translation.

Meanwhile, training a tagging model to output tags in another language tends to not be extensible since the task is very specific to the language domain. In fact, training a tagging model to translate tags into another language is impractical, if not impossible, due to the lack of language-specific data available for training. Moreover, obtaining sufficient training data for every language of interest across various domains is an expensive task. Training a tagging model to perform translation with insufficient amounts of training data will restrict the vocabulary available for translation purposes, thereby ensuring that the translated tags will be prone to errors.

Introduced here, therefore, is an approach to translating tags assigned to digital images using multimodal, cross-lingual embeddings. Such an approach not only avoids the obstacles associated with word-level translation, but also does not require training of an end-to-end tagging model. The term "end-to-end," as used herein, may be used to refer to a tagging model that is designed to produce tags for a digital image provided as input and then translate those tags into a given language. Moreover, the approach described herein can be readily extended across various languages, as further discussed below.

As further discussed below, the approach may be implemented by a graphics editing platform (or simply "editing platform") that relies on multimodal, cross-lingual embeddings to provide context for the digital image under consideration irrespective of the language. This allows tags produced in a source language to be properly translated into a target language. In some embodiments, the editing platform employs a "one for all" approach in which a tagging model trained with resource-rich data in English can be used for inference on multiple languages.

There are several benefits to the approach described herein when compared to conventional approaches to translation. First, the editing platform can use tags in a source language as context to facilitate accurate translation into a target language, as well as maintain source tag-target tag parity. Second, the approach described herein does not require retraining for each target language. As such, it is able to cover multiple target languages and operate in resource-restricted environments (e.g., where training data for target languages is limited).

Embodiments may be described with reference to particular tags, objects, model architectures, computer programs, etc. However, those skilled in the art will recognize that these features are similarly applicable to other types of tags, objects, model architectures, computer programs, etc. For example, while embodiments may be described in the context of translating tags in English into a target language, those skilled in the art will recognize that English is simply one example of a source language from which tags could be translated.

Embodiments may be described in the context of computer-executable instructions for the purpose of illustration. However, aspects of the technology can be implemented via hardware, firmware, or software. As an example, a set of algorithms representative of a multimodal model designed for labelling objects in digital images with tags and then translating those tags may be executed by an editing platform. The editing platform could be embodied using software that is executable by a computing device, or the editing platform could be embodied using special-purpose hardware (e.g., circuitry) that is implementable in a computing device.

Overview of Cross-Lingual Embedding-Driven Approach to Translation

Figure 3A:
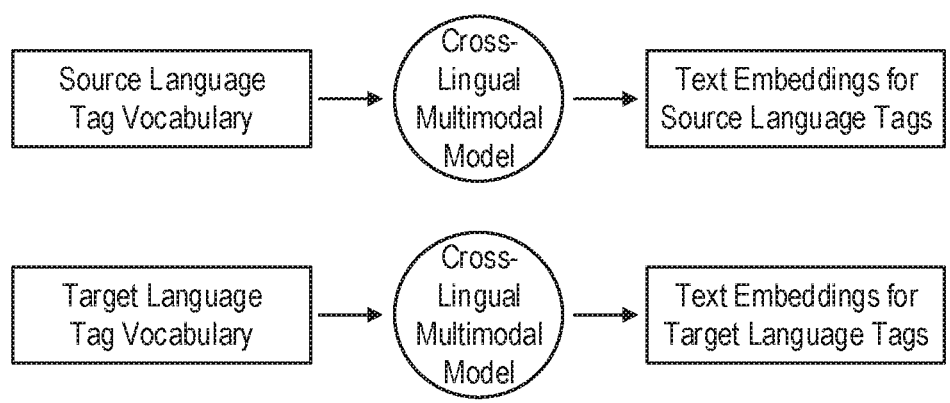
FIG. 3A illustrates how a multimodal model may be used during a first stage (also referred to as the "setup stage") to generate text embeddings.
Figure 3B:
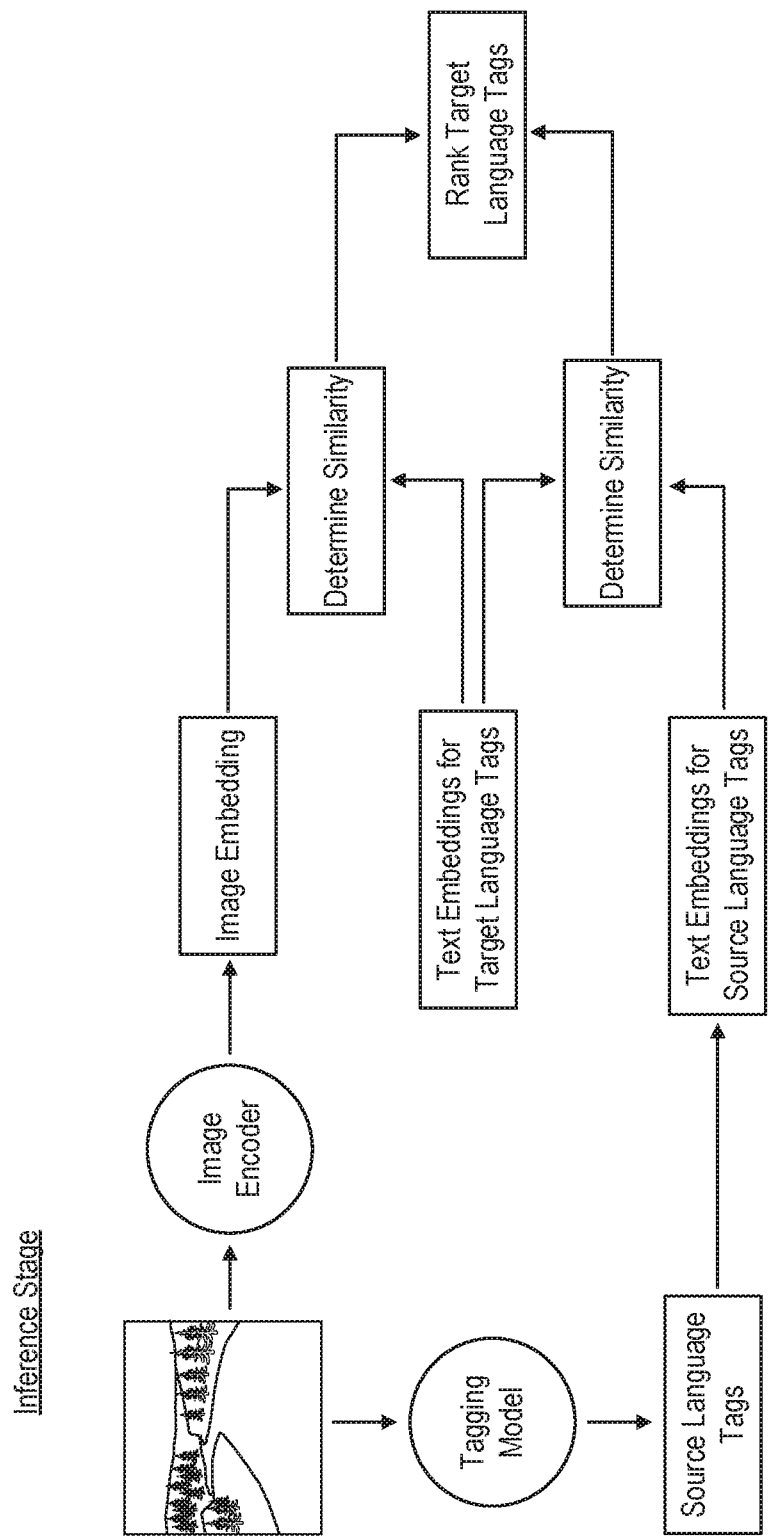
FIG. 3B illustrates how those text embeddings can be used in a second stage (also referred to as the "inference stage") to facilitate translation of tags from a source language into a target language.

To facilitate more accurate translation of a tag output in a source language, an editing platform may implement a multistage approach in which cross-lingual embeddings are used to establish the proper tag in a target language. FIGS. 3A-B are high-level illustrations of the approach. In particular, FIG. 3A illustrates how a multimodal model may be used during a first stage (also referred to as the "setup stage") to generate text embeddings, while FIG. 3B illustrates how those text embeddings can be used in a second stage (also referred to as the "inference stage") to facilitate translation of tags from a source language into a target language. For the purpose of illustration, English is used as the source language in this embodiment. However, those skilled in the art will recognize that another language could serve as the source language.

In the setup stage, an editing platform can extract text embeddings for tags available for a source language using a cross-lingual, multimodal model. These tags may be referred to as "source tags" for convenience. Similarly, the editing platform can extract text embeddings for tags available for a target language using the multimodal model. These tags may be referred to as "target tags" for convenience.

The term "embedding" refers to a translation of high-dimensional vector into a low-dimensional space. Ideally, an embedding will capture at least some of the semantics of the input by placing semantically similar inputs close together in the embedding space. Consider, for example, a tag that has been identified for a digital image. Using the multimodal model, the editing platform can represent the tag as a vector in which each element represents a different characteristic of the tag. Each element may contain a value between 0 and 1 that indicates the extent to which the tag represents the corresponding characteristic. In effect, the tag is semantically encoded using as many characteristics as there are elements in the vector. As further discussed below, the embedding for a given tag will be close to the embedding for a similar tag within the embedding space, even if meaning of those tags is different. For example, the term "spring" may be close to the terms "tree" and "blossom" despite being wholly different than one another. When represented as text embeddings, those terms should be close to one another because the semantic encoding is similar.

Note that the source and target tags for which text embeddings are extracted may be representative of all tags available for the source and target languages, respectively. Alternatively, the source and target tags for which text embeddings are extracted may be representative of a subset of all tags available for the source and target languages, respectively. The multimodal model, meanwhile, is further discussed below with reference to FIG. 4.

In the inference stage, the editing platform can use an image encoder to extract an image embedding from a digital image for which one or more tags are to be produced in a target language. Conceptually, the image embedding extracted from the digital image is largely similar to the text embeddings extracted during the setup stage. Digital images, however, are normally represented by multi-dimensional datasets that include individual raw pixel intensities. In its raw form, these datasets may not be useful for comparison purposes. As such, the editing platform may extract a lower-dimensional vector (referred to as an "image embedding") that provides some indication of what a digital image contains. The editing platform can accomplish this by training an image encoder (also referred to a "classification model") on a large dataset of digital images. Examples of image encoders include Inception, Deep Residual Learning (ResNet), and Network Architecture Search (NASNet). Then the editing platform can use the image encoder without the last classifier function to extract a feature-based vector for a digital image provided as input.

Then, the editing platform obtains a source tag for the digital image. Note that the origin of the source tag may vary depending on the embodiment. As shown in FIG. 3B, the editing platform may acquire the source tag by applying, to the digital image, a tagging model that is designed to produce the source tag as output. Alternatively, the editing platform may retrieve the source tag from a storage medium. In such embodiments, the source tag may have been previously output by a tagging model or specified by an individual. For the purpose of illustration, the following embodiment is described in the context of translating a single source tag. However, the approach is similarly applicable if multiple source tags associated with the digital image are to be translated.

The editing platform can then obtain a text embedding for the source tag. Again, this can occur in several different ways. If text embeddings were extracted for the entire vocabulary of source tags during a setup stage as discussed above with reference to FIG. 3A, then the editing platform may simply identify an existing text embedding that was previously created for the source tag. In other embodiments, upon determining that the source tag was output by the tagging model, the editing platform extracts a text embedding using the multimodal model.

Thereafter, the editing platform can establish similarity between the image embedding and each text embedding available for a target language into which the source tag is to be translated. The editing platform may compute similarity between the image embedding and the text embedding for a given target tag ($T_j$) as follows:

$$\text{Similarity}_{Image,T_j} = \cosine(\text{Embedding}_{Image}, \text{Embedding}_{T_j}). \quad \text{Eq. 1}$$

The editing platform can also establish similarity between the source tag and each text embedding available for the target language. The editing platform may compute similarity between the embedding associated with a given source tag ($S_i$) and the embedding associated with a given target tag ($T_j$) as follows:

$$\text{Similarity}_{S_i,T_j} = \cosine(\text{Embeddings}_{S_i}, \text{Embedding}_{T_j}). \quad \text{Eq. 2}$$

Accordingly, the editing platform may produce (i) a first set of similarity metrics that is indicative of similarity between the image embedding and the text embeddings for all target tags that are presently available and (ii) a second set of similarity metrics that is indicative of similarity between the text embedding for the source tag and the text embeddings for all target tags that are presently available. As mentioned above, this process will normally involve multiple source tags rather than a single source tag. Assume, for example, that N source tags are to be translated into a target language for which M target tags are available to the editing platform for translation purposes. In such a scenario, the first set of similarity metrics will be a 1-by-M vector, and the second set of similarity metrics will be an N-by-M matrix.

To identify the appropriate target tag for each source tag, the editing platform can compute a score for each target tag. This score may be individually computed with respect to the digital image and each source tag for which translation is desired. As an example, for each source tag ($S_i$):

Given $T_j \in$ Vocabulary of Target Language,
$$\text{Score}_{T_j} = W_1 * \text{Similarity}_{Image,T_j} + W_2 * \text{Similarity}_{S_i,T_j}, \quad \text{Eq. 3}$$

such that $W_1$ and $W_2$ collectively equal 1. These weights may be established through experimentation, and thus may vary depending on the datasets.

In some embodiments, a programmatic mapping indicating the relationships between source tags and target tags may exist. For example, the editing platform may have access to a data structure that indicates the term "spring" in English is associated with the terms "printemps," "ressort," and "point d'eau" in French. Generally, the data structure is manually programmed by an individual, though the data structure could be partially or entirely constructed by a neural network (e.g., under the supervision of an individual). In embodiments where such a programmatic mapping is available to the editing platform, Eq. 3 can be rewritten as follows:

$$\text{Score}_{T_j} = W_1 * \text{Similarity}_{Image,T_j} + W_2 * \text{Similarity}_{S_i,T_j} + W_3 * I, \quad \text{Eq. 3}$$

such that $W_1$, $W_2$, and $W_3$ collectively equal 1. Meanwhile, I is representative of an identify function that equals 1 if the tag under consideration is within the vocabulary of the target language and zero otherwise (i.e., I=1 if tag t∈T else I=0).

For each source tag, the editing platform can sort the entire vocabulary of target tags based on score and then identify the highest-ranking target tag as the proper translation. If the highest-ranked target tag was already selected for another source tag, then the editing platform may take the next highest-ranking target tag and so on. As further discussed below, the editing platform may provide the top k target tags as output. As an example, for each source tag, the editing platform may post the top 3, 5, or 10 target tags to an interface for review by an individual responsible for supervising the translation process.

There are several notable advantages to the approach described herein.

First, conventional approaches either do not consider any context when translating a given tag or rely solely on other tags to provide context for the given tag. In effect, those other tags act as a substitute for context that may be provided by the digital image itself. The approach described herein utilizes the digital image and source tags as context to provide better translations.

Second, the use of multi-lingual byte pair encoding (BPE) can be used to ensure that the approach described herein is language agnostic. This "one for all" strategy allows that the multimodal model to be trained on a single language (e.g., English) yet able to infer in many other languages. Accordingly, without training any end-to-end classification models, target tags could be generated for multiple (e.g., 4, 8 or 16) target languages.

Third, the approach described herein is not restricted by vocabulary. Instead, any changes to source language vocabulary or target language vocabulary simply requires extracting text embeddings for the newly added terms and then computing similarity as discussed above.

FIG. 4 illustrates how the multimodal approach compares to conventional machine translation when translating source tags in English into target tags in French. Ambiguous terms that have historically been difficult to properly translate are shown in bold. As can be seen in FIG. 4, more appropriate translations can be obtained by employing the multimodal approach in which context for a given source tag is derived from the digital image and other source tags.

Overview of Cross-Lingual, Multimodal Model

Figure 5:
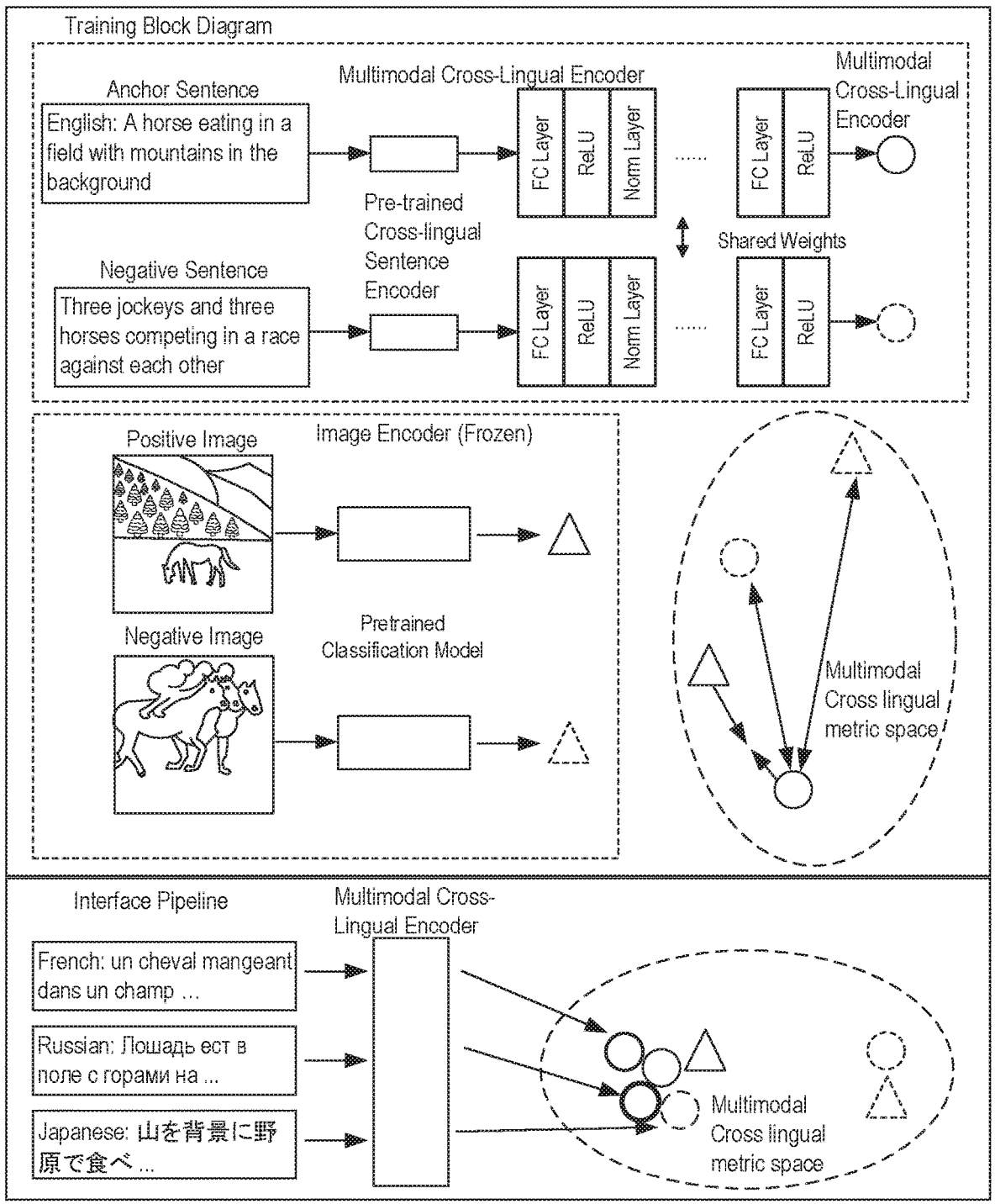
FIG. 5 includes a high-level illustration of the cross-lingual, multimodal model that can be used to facilitate translation from a source language into multiple target languages.

FIG. 5 includes a high-level illustration of the cross-lingual, multimodal model that can be used to facilitate translation from a source language into multiple target languages. Initially, a multimodal model is trained to obtain digital image and text representations in the same space. As shown in FIG. 5, it is a "zero-shot" approach in which the model is trained using English training data via metric learning to map digital images and tags to one another in the same embedding space. The English training data may include various image-tag pairs that serve as ground truths for tagging purposes.

The English training data can be converted into cross-lingual text embeddings using a multi-lingual sentence encoder for initialization. This ensures that the multimodal model has inference capability in multiple languages, even though the multimodal model is trained with training data in a single language. For example, the multimodal model may have inference capability in 4, 8, or 16 languages.

After the cross-lingual text embeddings are generated, those embeddings can be provided as input to consecutive blocks of a fully connected layer, an activation function (here, the Rectified Linear Unit referred to as "ReLU"), and a normalization layer, except for the last block which may not include the normalization layer. For example, those embeddings could be provided as input to 2, 3, or 4 "sets" of blocks that are identical except for the last set as mentioned above. Collectively, these blocks may represent fully connected layers of a deep convolutional neural network (or simply "neural network").

To extract image embeddings for digital images, the editing platform can employ an image encoder that uses embeddings created for a library of stock digital images. As an example, the image encoder may curate millions of stock digital images and the corresponding captions/queries for training data. Those stock digital images may be two- or three-dimensional digital images. At a high level, the image encoder is trained on the library of stock digital images while image embeddings are generated using the layer immediately above the classifier function, as shown in FIG. 5. One example of a classification function is the softmax function that is representative of a generalization of the logistic function to multiple dimensions. When used as the last activation function of a neural network, the softmax function normalizes the output to a probability distribution over predicted output classes.

One goal of the approach described herein is to bring the cross-lingual text embeddings into the image embedding space (also referred to as the "visual embedding space") using metric learning. This is why the editing platform can employ an image encoder to extract image embeddings from digital images but employs the multimodal model to extract text embeddings from tags. For each pairing of text caption (referred to as "anchor text") and positive digital image, the editing platform can mine a hard negative strategy within a training "mini-batch" using an online negative sampling strategy. The text caption corresponding to the negative digital image can be treated as the hard negative text. If there is more than one caption per digital image, then the editing platform may select one using random sampling.

The editing platform can employ an objective loss function, such as the one referred to as "multimodal metric loss" or "M3L," to help reduce the distance between the anchor text and corresponding positive digital image while pushing away the negative text caption and negative digital image from the anchor text. An example of an objective loss function follows:

$$L_{M3} = \frac{\alpha_1 * d(te_{an}, im_p)^\rho}{d(te_{an}, im_n)^\rho} + \frac{\alpha_2 * d(te_{an}, im_p)^\rho}{d(te_{an}, te_n)^\rho}, \quad \text{Eq. 4}$$

where $te_{an}$ is the anchor text and $te_n$ is the negative text caption, while $im_p$ and $im_n$ are the positive and negative digital images, respectively. $d(x,y)$ is the square distance between x and y. Rho ($\rho$) controls the sensitivity of the change in distance, and alpha ($\alpha_1$, $\alpha_2$) is the scaling factor for each negative distance modality.

Further information regarding cross-lingual multimodal models can be found in U.S. application Ser. No. 17/075,450, which is incorporated herein by reference in its entirety. The multimodal model shown in FIG. 5 is simply one example of a multimodal model that could be used by the editing platform. Any model able to convert tags in multiple languages into image embeddings could be used by the editing platform.

Overview of Editing Platform

Figure 6:
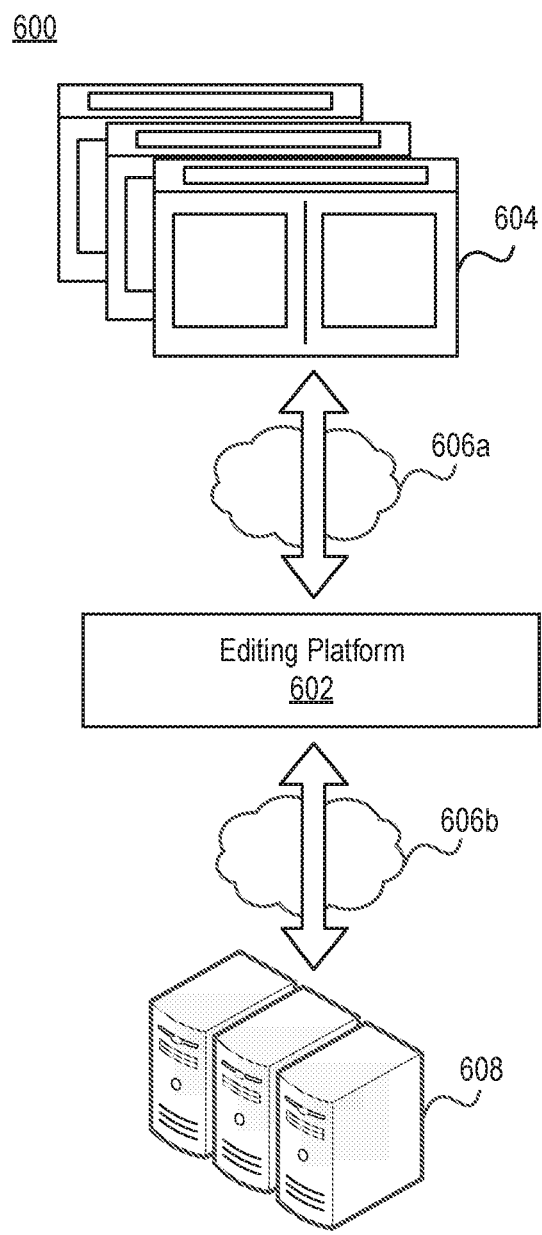
FIG. 6 illustrates a network environment that includes an editing platform able to execute instructions for translating tags assigned to digital images using cross-lingual embeddings.

FIG. 6 illustrates a network environment 600 that includes an editing platform 602 able to execute instructions for translating tags assigned to digital images using cross-lingual embeddings. As further discussed below, the editing platform 602 may be comprised of a series of modules operable to obtain digital image and a text embedding for a source tag associated with the digital image, extract an image embedding for the digital image, and then compare (i) the text embedding to text embeddings for target tags associated with a target language into which the source tag is to be translated and (ii) the image embedding to the text embeddings for the target tags. The term "module" refers broadly to software components, firmware components, and/or hardware components. Accordingly, aspects of the editing platform 602 could be implemented in software, firmware, and/or hardware.

As shown in FIG. 6, individuals can interface with the editing platform 602 via interfaces 604. The editing platform 602 may be responsible for creating the interfaces through which digital images can be created, edited, viewed, imported, and exported. Examples of editing platforms include raster graphics editors and vector graphics editors. While the technology may be described as being implemented by an editing platform, the technology could be implemented by other types of computer programs. As an example, the technology could be implemented by a computer program through which digital images in a storage medium can be searched (e.g., by entering queries that include one or more tags).

In some embodiments, the digital image for which tags in a target language are to be produced by may be created and/or modified through the editing platform 602. In other embodiments, the digital image is uploaded to the editing platform 602. For example, an individual may access the editing platform 602 and then select, via an interface generated by the editing platform 602, a digital image in a storage medium for which tags in a target language are to be identified.

As noted above, the editing platform 602 may reside in a network environment 600. Thus, the editing platform 602 may be connected to one or more networks 606a-b. The network(s) 606a-b can include personal area networks (PANs), local area networks (LANs), wide area networks (WANs), metropolitan area networks (MANs), cellular networks, the Internet, etc. Additionally or alternatively, the editing platform 602 can be communicatively connected to computing device(s) over a short-range wireless connectivity technology, such as Bluetooth®, Near Field Communication (NFC), Wi-Fi® Direct (also referred to as "Wi-Fi P2P"), and the like.

The interfaces 604 may be accessible via a web browser, desktop application, mobile application, or over-the-top (OTT) application. Accordingly, the interfaces 604 may be viewed on a personal computer, tablet computer, mobile phone, wearable electronic device (e.g., a watch or fitness accessory), network-connected ("smart") electronic device, (e.g., a television or home assistant device), virtual/augmented reality system (e.g., a head-mounted display), or some other electronic device.

In some embodiments, at least some components of the editing platform 602 are hosted locally. That is, part of the editing platform 602 may reside on the computing device used to access one of the interfaces 604. For example, the editing platform 602 may be embodied as a desktop application executing on a personal computer. Note, however, that the desktop application may be communicatively connected to a network-accessible resource. Examples of network-accessible resources include private storage mediums (e.g., those maintained by enterprises or individuals), private cloud infrastructures, and public cloud infrastructures. The network-accessible resource may host other components of the editing platform 602, or the network-accessible resource may host content, such as digital images, that can be used by the editing platform 602.

In other embodiments, the editing platform 602 is executed entirely by a cloud computing service operated by, for example, Amazon Web Services® (AWS), Google Cloud Platform™, or Microsoft Azure®. In such embodiments, the editing platform 602 may reside on a network-accessible server system 608 comprised of one or more computer servers. These computer server(s) can include different types of data (e.g., digital images, tagging model, multimodal model, tags in various languages), user information (e.g., profiles and credentials), and other assets.

Figure 7:
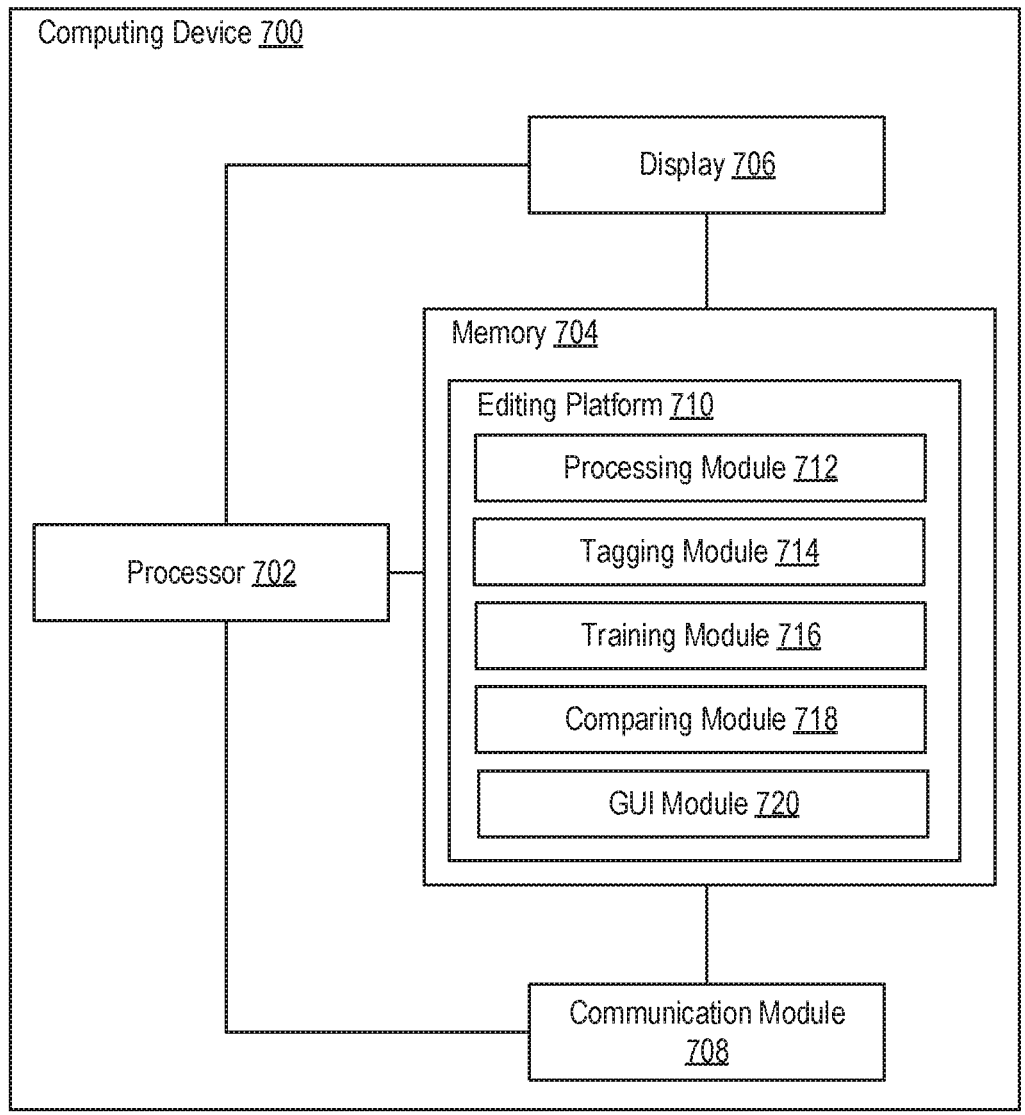
FIG. 7 illustrates an example of a computing device that is capable of implementing the approaches described herein.

FIG. 7 illustrates an example of a computing device 700 that is capable of implementing the approaches described herein. Note that the components shown in FIG. 7 are merely illustrative. Components that are well known are not shown for simplicity. Referring to FIG. 7, the computing device 700 may include a processor 702, memory 704, display 706, and communication module 708.

The communication module 708 may be, for example, wireless communication circuitry designed to establish wireless communication channels with other computing devices. Examples of wireless communication circuitry include integrated circuits (also referred to as "chips") configured for Bluetooth, Wi-Fi, NFC, and the like. The processor 702 can have generic characteristics similar to general-purpose processors, or the processor 702 may be an application-specific integrated circuit (ASIC) that provides control functions to the computing device 700. As shown in FIG. 7, the processor 702 can be coupled to all components of the computing device 700, either directly or indirectly, for communication purposes.

The memory 704 may be comprised of any suitable type of storage medium, such as static random-access memory (SRAM), dynamic random-access memory (DRAM), electrically erasable programmable read-only memory (EEPROM), flash memory, or registers. In addition to storing instructions that can be executed by the processor 702, the memory 704 can also store data generated by the processor 702 (e.g., when executing the modules of the editing platform 710). Note that the memory 704 is merely an abstract representation of a storage environment. The memory 704 could be comprised of actual memory chips or modules.

For convenience, the editing platform 710 may be referred to as a computer program that resides within the memory 704. However, the editing platform 710 could be comprised of software, firmware, and/or hardware components implemented in, or accessible to, the computing device 700. In accordance with embodiments described herein, the editing platform 710 may include a processing module 712, tagging module 714, training module 716, comparing module 718, and graphical user interface (GUI) module 720. These modules can be an integral part of the editing platform 710. Alternatively, these modules can be logically separate from the editing platform 710 but operate "alongside" it. Together, these modules enable the editing platform 710 to translate tags associated with a digital image in a manner that addresses the downsides of conventional approaches that result in inaccurate translations.

Initially, the editing platform 710 can obtain a digital image. For example, upon receiving input indicative of a selection of the digital image through an interface generated by the GUI module 720, the editing platform 710 may acquire the digital image from the memory 704. Alternatively, the editing platform 710 may acquire the digital image from a memory external to the computing device 700 via the communication module 708.

The processing module 712 may be responsible for processing the digital image and accompanying metadata that is obtained by the editing platform 710 into a format suitable for the other modules. Said another way, the processing module 712 may be responsible for ensuring that data acquired by the editing platform 710 is made accessible to the other modules. For example, the processing module 712 may apply operations to the underlying pixels so that the digital image is filtered, resized, or altered in some other manner. As another example, the processing module 712 may parse the metadata that accompanies the digital image to extract tags that were previously assigned to the digital image.

The tagging module 714 may be responsible for obtaining source tags to be translated. As discussed above, this can be accomplished in several ways. In some embodiments, the tagging module 714 acquires the source tags by applying, to the digital image, a tagging model that is designed to produce the source tags as output. In other embodiments, the tagging module 714 may retrieve the source tags from the memory 704. The source tags may already be in the memory 704 if, for example, those source tags were previously translated into a different target language (e.g., Spanish) than the target language (e.g., French) for which translation is to be performed. Alternatively, the processing module 712 may extract the source tags from metadata that accompanies the digital image, as discussed above. In such embodiments, the tagging module 714 can acquire the source tags from the processing module 712.

The training module 716 may be responsible for generating embeddings for the digital image and source tags to be translated. The training module 716 may produce an image embedding by applying an image encoder to the digital image. Similarly, the training module 716 may produce text embeddings by applying the multimodal model to the source tags. As discussed above, the editing platform 710 is designed to facilitate translation of source tags into corresponding target tags in a target language. The training module 716 may be responsible for obtaining text embeddings for all target tags available in each target language for which translation is supported. Assume, for example, that the editing platform 710 is designed to facilitate translation of source tags in English into target tags in Spanish, French, and German. For each of those languages, the training module 716 may identify the entire vocabulary of target tags that are presently available and then extract a text embedding for each target tag (e.g., using the multimodal model).

The comparing module 718 may be responsible for comparing the image embedding for the digital image, the text embeddings for the source tags, and the text embeddings for the target tags in order to identify, for each source tag, an appropriate target tag. Said another way, the comparing module 718 can establish similarity on a per-source-tag basis to establish appropriate target tags in the target language for the digital image. As discussed above with reference to FIG. 3B, the comparing module 718 can compute similarity between the image embedding and text embeddings for the target tags, and the comparing module 718 can compute similarity between the text embeddings for the source tags and the text embeddings for the target tags. As such, the comparing module 718 may produce (i) a first set of similarity metrics that is indicative of similarity between the image embedding and text embeddings for the target tags and (ii) a second set of similarity metrics that is indicative of similarity between the text embeddings for the source tags and the text embeddings for the target tags. The comparing module 718 can then select, based on the first and second sets of similarity metrics, an appropriate target tag for each source tag.

Methodologies for Translating Tags Using Cross-Lingual Embeddings

Figure 8:
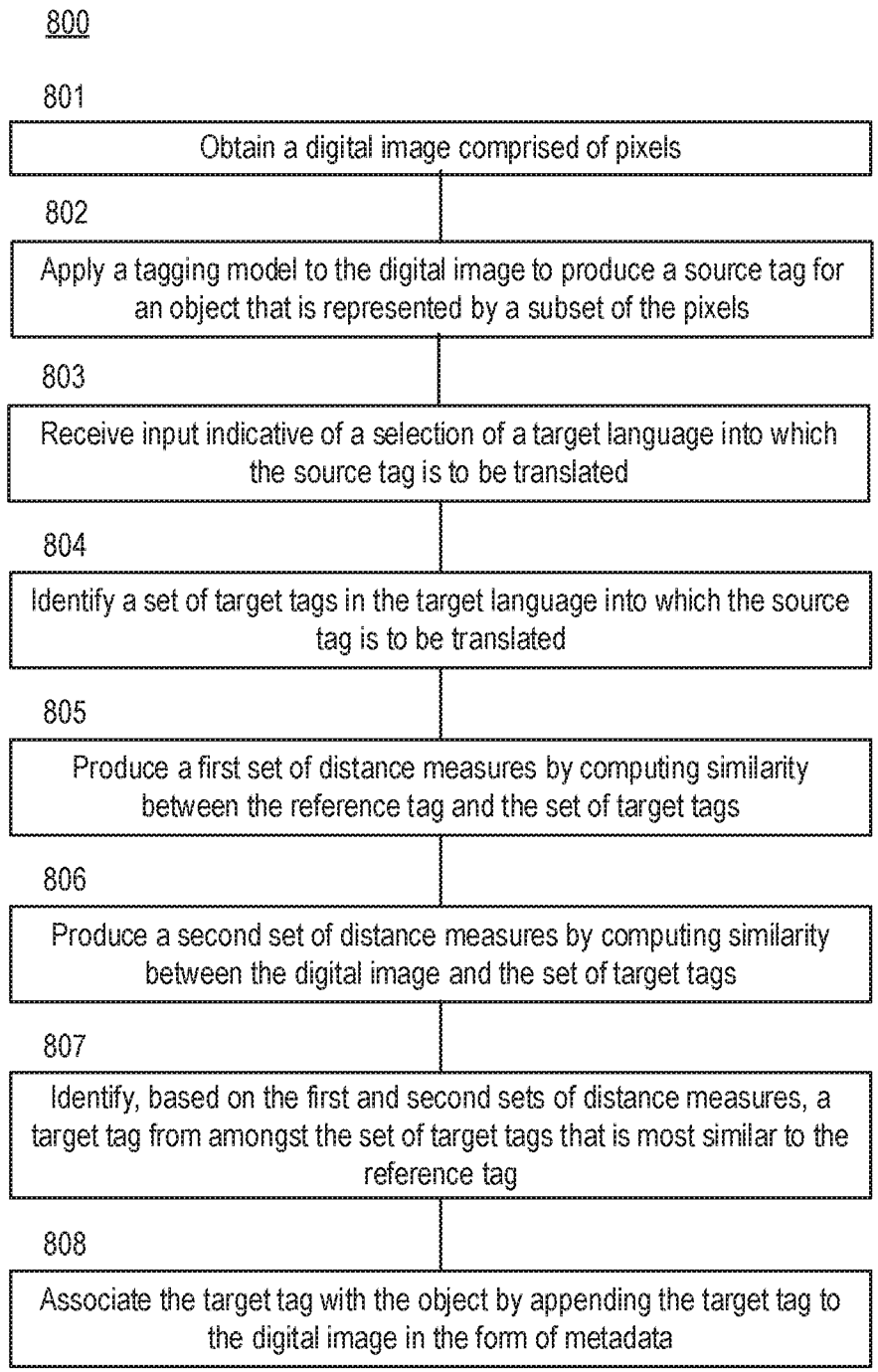
FIG. 8 depicts a flow diagram of a process for translating a source tag associated with a digital image into a target language.

FIG. 8 depicts a flow diagram of a process 800 for translating a source tag associated with a digital image into a target language. Initially, an editing platform can obtain a digital image comprised of pixels (step 801). Generally, the digital image is selected by an individual through an interface generated by the editing platform. Thus, responsive to receiving input indicative of a selection of the digital image, the editing platform may obtain the digital image. Note that the digital image could be stored in the computing device that is executing the editing platform, or the digital image could be stored in a storage medium that is accessible to the computing device via a network.

The editing platform can then apply a tagging model to the digital image to produce a source tag for an object that is represented by a subset of the pixels (step 802). Moreover, the editing platform may receive input indicative of a selection of a target language into which the source tag is to be translated (step 803). For example, the editing platform may generate an interface through which an individual can specify the target language into which the source tag is to be translated. As another example, the editing platform may establish, based on an existing preference (e.g., specified in a profile associated with the individual who initiated the process 800), the target language in which the source tag is to be translated. Because the source tag serves as the basis for translation, it may also be referred to as the "reference tag." Before the source tag is translated from a source language (also referred to as a "default language" or "reference language") into the target language, the editing platform identifies a set of target tags in the target language (step 804). This set of target tags may be representative of all tags that are available in the target language. Alternatively, this set of target tags may be representative of a subset of all tags that are available in the target language.

Thereafter, the editing platform can produce a first set of distance measures by computing similarity between the source tag and the set of target tags (step 805). Each distance measure in the first set of distance measures may be indicative of similarity between the source tag and a corresponding target tag. In some embodiments, the first set of distance measures is produced by computing cosine similarity between a text embedding extracted for the source tag and a set of text embeddings extracted for the set of target tags, as further discussed below. Moreover, the editing platform can produce a second set of distance measures by computing similarity between the digital image and the set of target tags (step 806). Each distance measure in the second set of distance measures may be indicative of similarity between the digital image and a corresponding target tag. In some embodiments, the second set of distance measures is produced by computing cosine similarity between an image embedding extracted for the digital image and the set of text embeddings extracted for the set of target tags, as further discussed below.

Then, the editing platform can identify, based on the first and second sets of distance measures, a target tag from amongst the set of target tags that is most similar to the reference tag (step 807). Such an approach allows the editing platform to consider context provided by the digital image rather than simply rely solely on the source tag. The editing platform may associate the target tag with the object by appending the target tag to the digital image in the form of metadata (step 808). Additionally or alternatively, the editing platform may populate a data structure that programmatically associates the source and target tags with the digital image and with each other. This data structure may be designed, populated, and then stored in such a manner that the digital image is searchable based on queries entered in either the source language or target language.

Figure 9:
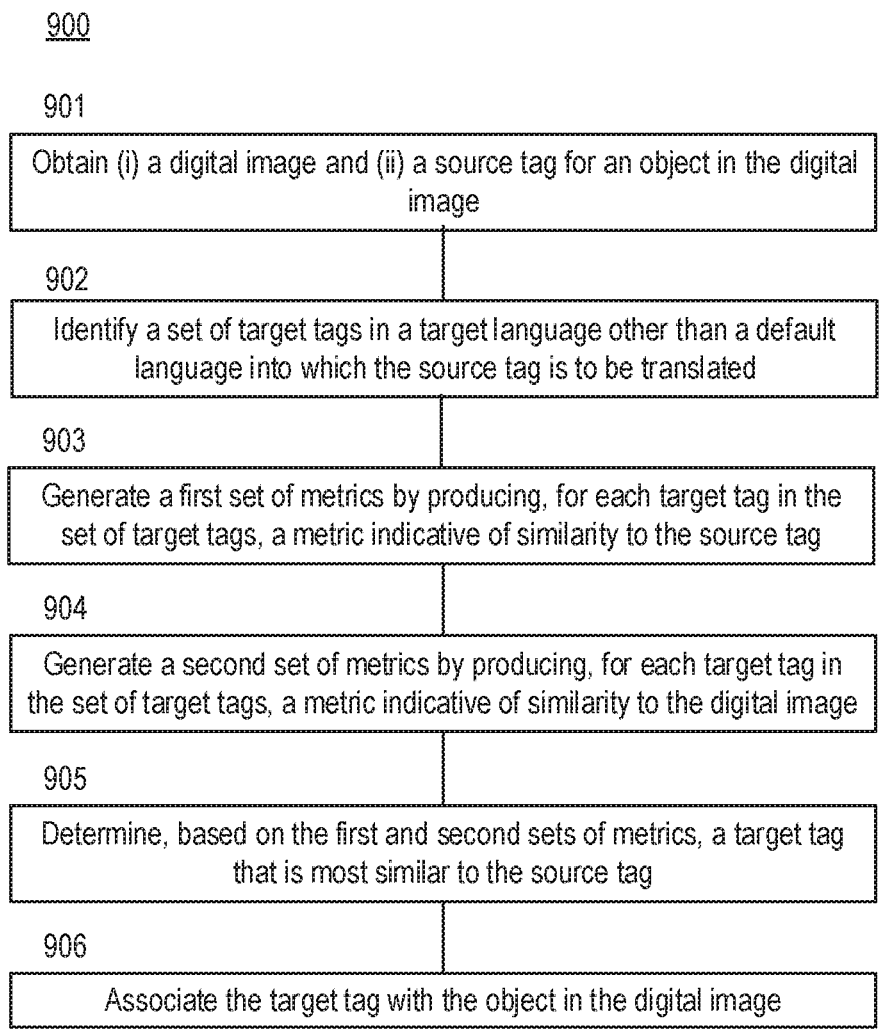
FIG. 9 depicts a flow diagram of another process for translating a source tag associated with a digital image into a target language.

FIG. 9 depicts a flow diagram of another process 900 for translating a source tag associated with a digital image into a target language. Initially, an editing platform can obtain (i) a digital image and (ii) a source tag for an object in the digital image (step 901). As discussed above, the editing platform could obtain the source tag by applying, to the digital image, a tagging mode comprised of a series of algorithms that are trained to output the source tag through analysis of the digital image and identification of the object. Alternatively, the editing platform could extract the source tag from metadata corresponding to the digital image. As another example, the editing platform may cause the digital image to be displayed on an interface accessible via a computing device and then receive input, provided through the interface, that specifies the source tag.

The editing platform can then identify a set of target tags in the target language (step 902). The term "target language" may be used to refer to any language other than the default language of the source tag. For each target tag in the set of target tags, the editing platform can produce a metric indicative of similarity to the source tag. Said another way, the editing platform can generate a first set of metrics by producing, for each target tag in the set of target tags, a metric indicative of similarity to the source tag (step 903). Moreover, the editing platform can generate a second set of metrics by producing, for each target tag in the set of target tags, a metric indicative of similarity to the digital image (step 904). Thus, each target tag may be associated with a pair of metrics, one indicative of similarity to the digital image and one indicative of similarity to the source tag.

The editing platform can determine, based on the first and second sets of metrics, a target tag that is most similar to the source tag (step 905). As discussed above with reference to FIG. 3B, the editing platform can accomplish this by sorting the set of target tags in order from most to least similar and then selecting the highest-ranking target tag. Moreover, the editing platform can associate the target tag with the object in the digital image (step 906). In some embodiments the editing platform accomplishes this by appending the target tag to the digital image in the form of metadata, while in other embodiments the editing platform accomplishes this by programmatically associating the target tag with the digital image and/or the source tag in a data structure.

Figure 10:
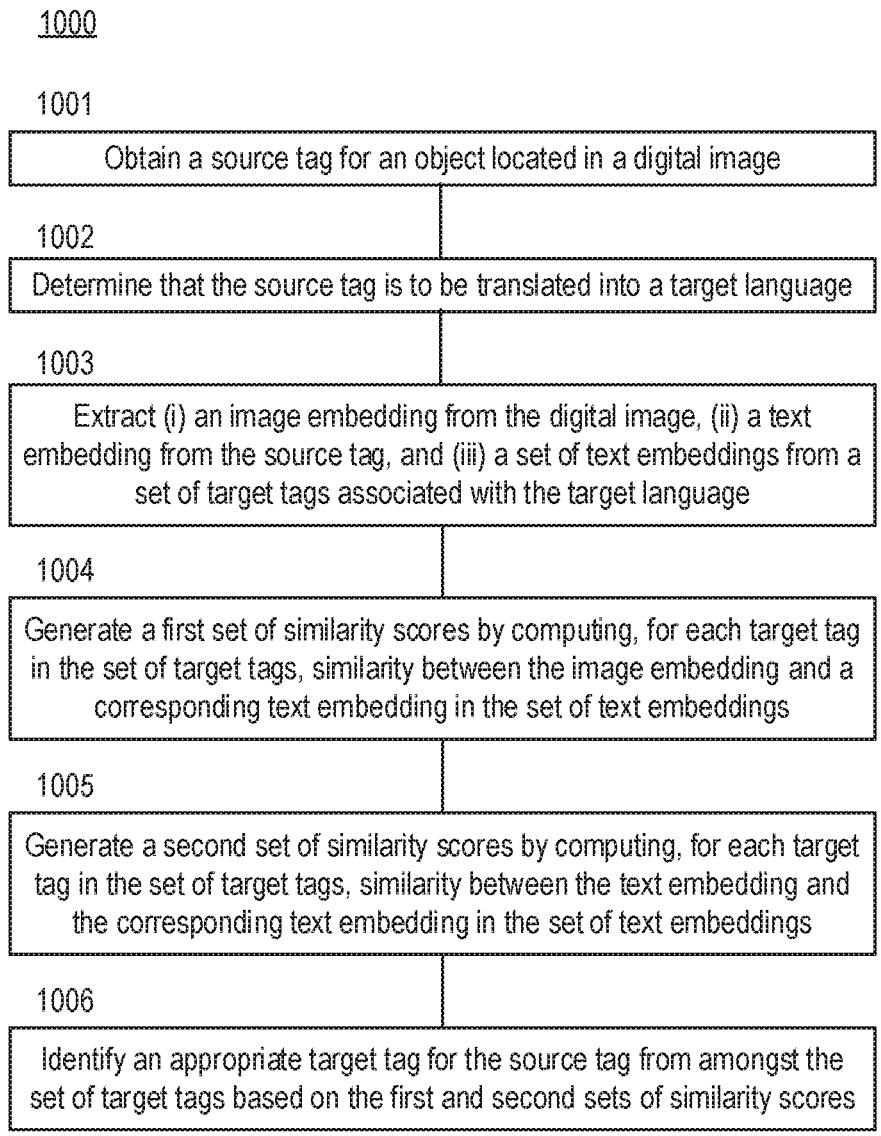
FIG. 10 depicts a flow diagram of a process for translating a source tag into a target language using cross-lingual embeddings.

FIG. 10 depicts a flow diagram of a process 1000 for translating a source tag into a target language using cross-lingual embeddings. Initially, an editing platform obtains a source tag for an object located in a digital image (step 1001). Step 1001 of FIG. 10 may be largely identical to step 801 of FIG. 8 and step 901 of FIG. 9.

Thereafter, the editing platform may determine that the source tag is to be translated into a target language (step 1002). Such a determination may be based on input provided by an individual who initiates the process 1000. For example, the individual may select the target language through an interface generated by the editing platform. Alternatively, such a determination may be based on actions performed through the editing platform. As an example, the editing platform may determine that translation is desired if a project presently being worked on through the editing platform is in a language other than English or if another request for translation was recently submitted.

Before translation is performed, the editing platform may employ an image encoder and multimodal model to extract embeddings for the digital image, the source tag, and a set of target tags associated with the target language. More specifically, the editing platform can extract (i) an image embedding by applying the image encoder to the digital image, (ii) a text embedding by applying the multimodal model to the source tag, and (iii) a set of text embeddings by applying the multimodal model to the set of target tags (step 1003). Each embedding may be representative of a vector that captures at least some of the semantics of the corresponding input. For example, the image embedding may be a real-valued vector that includes values for various semantic features of the digital image, while the text embeddings may be real-valued vectors that include values for various semantic features of the source and target tags.

The editing platform can generate a first set of similarity scores by computing, for each target tag in the set of target tags, similarity between the image embedding and a corresponding text embedding in the set of text embeddings (step 1004). The editing platform can also generate a second set of similarity scores by computing, for each target tag in the set of target tags, similarity between the text embedding and the corresponding text embedding in the set of text embeddings (step 1005). Together, the first and second sets of similarity scores indicate similarity of each target tag with respect to two different reference points, the digital image and the source tag.

The editing platform can identify an appropriate target tag for the source tag from amongst the set of target sets based on the first and second sets of similarity scores (step 1006). For example, the editing platform may calculate, for each target tag in the set of target tags, a weighted sum of the corresponding similarity scores in the first and second sets of similarity scores. Then, the editing platform may select whichever tag in the set of target tags has the highest weighted sum as the appropriate target tag. Target tags with higher weighted sums may be more similar to the source tag, while target tags with lower weighted sums may be less similar to the source tag. Because similarity to the digital image and source tag is considered, the editing platform can avoid some of the drawbacks associated with conventional approaches to translation.

Unless contrary to physical possibility, it is envisioned that the steps described above may be performed in various sequences and combinations. As an example, the editing platform may execute the processes 800, 900, 1000 multiple times in succession if the source tag is one of multiple source tags to be translated. Each time that one of the processes 800, 900, 1000 is executed, a different tag associated with the digital image may serve as the source tag.

Other steps may also be included in some embodiments. As an example, the editing platform can cause display of one or more target tags on an interface accessible via a computing device for review by an individual. For instance, the editing platform may display a single target tag (e.g., the top target tag in terms of similarity), or the editing platform may display multiple target tags. In embodiments where multiple target tags are shown on the interface, the target tags may be presented in descending order in terms of similarity. The editing platform may also be able to receive input indicative of a confirmation or a rejection of the translation. Confirmation may serve as an indication that the translation process can proceed. However, if the editing platform receives input indicative of a rejection of the translation, the editing platform could either attempt to reinitiate the translation process or suggest the next highest-ranking target tag as the appropriate translation.

Processing System

Figure 11:
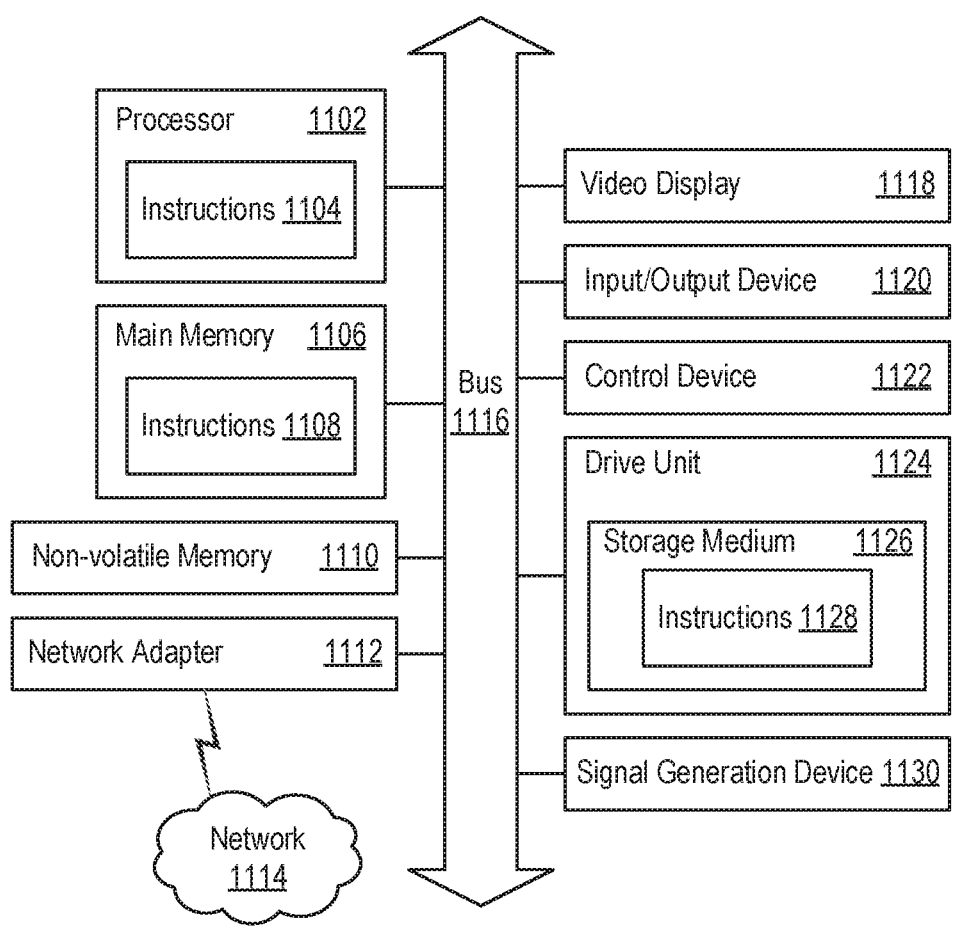
FIG. 11 is a block diagram illustrating an example of a processing system in which at least some operations described herein can be implemented.

FIG. 11 is a block diagram illustrating an example of a processing system 1100 in which at least some operations described herein can be implemented. For example, components of the processing system 1100 may be hosted on a computing device that includes an editing platform (e.g., editing platform 602 of FIG. 6 or editing platform 710 of FIG. 7).

The processing system 1100 may include a processor 1102, main memory 1106, non-volatile memory 1110, network adapter 1112 (e.g., a network interface), video display 1118, input/output device 1120, control device 1122 (e.g., a keyboard, pointing device, or mechanical input such as a button), drive unit 1124 that includes a storage medium 1126, or signal generation device 1130 that are communicatively connected to a bus 1116. The bus 1116 is illustrated as an abstraction that represents one or more physical buses and/or point-to-point connections that are connected by appropriate bridges, adapters, or controllers. The bus 1116, therefore, can include a system bus, Peripheral Component Interconnect (PCI) bus, PCI-Express bus, HyperTransport bus, Industry Standard Architecture (ISA) bus, Small Computer System Interface (SCSI) bus, Universal Serial Bus (USB), Inter-Integrated Circuit ($I^2C$) bus, or a bus compliant with Institute of Electrical and Electronics Engineers (IEEE) Standard 1394.

The processing system 1100 may share a similar computer processor architecture as that of a computer server, router, desktop computer, tablet computer, mobile phone, video game console, wearable electronic device (e.g., a watch or fitness tracker), network-connected ("smart") device (e.g., a television or home assistant device), augmented or virtual reality system (e.g., a head-mounted display), or another electronic device capable of executing a set of instructions (sequential or otherwise) that specify action(s) to be taken by the processing system 1100.

While the main memory 1106, non-volatile memory 1110, and storage medium 1126 are shown to be a single medium, the terms "storage medium" and "machine-readable medium" should be taken to include a single medium or multiple media that stores one or more sets of instructions 1126. The terms "storage medium" and "machine-readable medium" should also be taken to include any medium that is capable of storing, encoding, or carrying a set of instructions for execution by the processing system 1100.

In general, the routines executed to implement the embodiments of the present disclosure may be implemented as part of an operating system or a specific application, component, program, object, module, or sequence of instructions (collectively referred to as "computer programs"). The computer programs typically comprise one or more instructions (e.g., instructions 1104, 1108, 1128) set at various times in various memories and storage devices in a computing device. When read and executed by the processor 1102, the instructions cause the processing system 1100 to perform operations to execute various aspects of the present disclosure.

While embodiments have been described in the context of fully functioning computing devices, those skilled in the art will appreciate that the various embodiments are capable of being distributed as a program product in a variety of forms. The present disclosure applies regardless of the particular type of machine- or computer-readable medium used to actually cause the distribution. Further examples of machine- and computer-readable media include recordable-type media such as volatile and non-volatile memory devices 1110, removable disks, hard disk drives, optical disks (e.g., Compact Disk Read-Only Memory (CD-ROMS) and Digital Versatile Disks (DVDs)), cloud-based storage, and transmission-type media such as digital and analog communication links.

The network adapter 1112 enables the processing system 1100 to mediate data in a network 1114 with an entity that is external to the processing system 1100 through any communication protocol supported by the processing system 1100 and the external entity. The network adapter 1112 can include a network adaptor card, a wireless network interface card, a switch, a protocol converter, a gateway, a bridge, a hub, a receiver, a repeater, or a transceiver that includes an integrated circuit (e.g., enabling communication over Bluetooth or Wi-Fi).

REMARKS

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling those skilled in the relevant art to understand the claimed subject matter, the various embodiments, and the various modifications that are suited to the particular uses contemplated.

Although the Detailed Description describes certain embodiments and the best mode contemplated, the technology can be practiced in many ways no matter how detailed the Detailed Description appears. Embodiments may vary considerably in their implementation details, while still being encompassed by the specification. Particular terminology used when describing certain features or aspects of various embodiments should not be taken to imply that the terminology is being redefined herein to be restricted to any specific characteristics, features, or aspects of the technology with which that terminology is associated. In general, the terms used in the following claims should not be construed to limit the technology to the specific embodiments disclosed in the specification, unless those terms are explicitly defined herein. Accordingly, the actual scope of the technology encompasses not only the disclosed embodiments, but also all equivalent ways of practicing or implementing the embodiments.

The language used in the specification has been principally selected for readability and instructional purposes. It may not have been selected to delineate or circumscribe the subject matter. It is therefore intended that the scope of the technology be limited not by this Detailed Description, but rather by any claims that issue on an application based hereon. Accordingly, the disclosure of various embodiments is intended to be illustrative, but not limiting, of the scope of the technology as set forth in the following claims.

What is claimed is:

1. A method comprising:
  obtaining a source tag in a source language for an object located in a digital image;
  determining that the source tag is to be translated from the source language into a target language;
  extracting:
    an image embedding from the digital image using an image encoder;
    a source text embedding from the source tag in the source language using a multimodal model; and
    a set of target text embeddings from a set of target tags in the target language using the multimodal model;
  generating a first set of similarity scores representing measures of similarity between the digital image and each target tag in the set of target tags by comparing the image embedding with each of the target text embeddings in the set of target text embeddings;
  generating a second set of similarity scores representing measures of similarity between the source tag and the set of target tags by comparing the source text embedding and each of the target text embeddings in the set of target text embeddings; and
  selecting, from the set of target tags, an appropriate target tag as a translation of the source tag by combining the first set of similarity scores and the second set of similarity scores.

2. The method of claim 1, wherein extracting the image embedding, the source text embedding, and the set of target text embeddings comprises generating vector representations of the image embedding, the source text embedding, and the set of target text embeddings in a multimodal cross lingual metric space.

3. The method of claim 1,
  wherein extracting the image embedding comprises utilizing the image encoder to generate a real-valued feature vector from the digital image;
  wherein extracting the source text embedding comprises utilizing the multimodal model to generate a real-valued feature vector from the source tag; and
  wherein extracting the set of target text embeddings comprises utilizing the multimodal model to generate a real-valued feature vector from the set of target tags.

4. The method of claim 1, wherein the set of target tags comprises a vocabulary of tags that are available in the target language.

5. The method of claim 1, wherein selecting the appropriate target tag comprises:
  calculating, for each target tag in the set of target tags, a weighted sum of a first similarity score from the first set of similarity scores and a second similarity score from the second set of similarity scores; and
  selecting a target tag with a highest weighted sum as the appropriate target tag.

6. The method of claim 1, further comprising:
  causing display of at least a portion of the set of target tags on an interface accessible via a computing device, wherein the at least a portion of the set of target tags is presented in descending order of respective combinations of similarity scores from the first set of similarity scores and the second set of similarity scores.

7. The method of claim 1, wherein selecting the appropriate target tag comprises:
- determining a mapping between the source tag and a target tag in the set of target tags by calculating, for the target tag, a weighted sum of an identity function and similarity scores in the first set of similarity scores and the second set of similarity scores corresponding to the target tag; and
- selecting the target tag as the appropriate target tag based on the mapping.

8. The method of claim 1, wherein the object is one of multiple objects in the digital image, and wherein each of the multiple objects is associated with a different source tag to be translated into the target language.

9. The method of claim 1, wherein selecting the appropriate target tag comprises:
- determining a first target tag from the set of target tags identified as a translation for another source tag associated with another object within the digital image; and
- based on identifying the first target tag as the translation for another source tag, selecting a second target tag from the set of target tags as the appropriate target tag.

10. The method of claim 1, wherein obtaining the source tag comprises:
- applying a tagging model to the digital image that generates the source tag from the object located in the digital image.

11. A non-transitory computer readable medium comprising instructions that, when executed by a processing device, cause the processing device to perform operations comprising:
- obtaining a source tag in a source language for an object located in a digital image;
- determining that the source tag is to be translated from the source language into a target language;
- extracting:
  - an image embedding from the digital image using an image encoder;
  - a source text embedding from the source tag in the source language using a multimodal model; and
  - a set of target text embeddings from a set of target tags in the target language using the multimodal model;
- generating a first set of similarity scores representing measures of similarity between the digital image and each target tag in the set of target tags by comparing the image embedding with each of the target text embeddings in the set of target text embeddings;
- generating a second set of similarity scores representing measures of similarity between the source tag and the set of target tags by comparing the source text embedding and each of the target text embeddings in the set of target text embeddings; and
- selecting, from the set of target tags, an appropriate target tag as a translation of the source tag by combining the first set of similarity scores and the second set of similarity scores.

12. The non-transitory computer readable medium of claim 11, wherein extracting the image embedding, the source text embedding, and the set of target text embeddings comprises generating vector representations of the image embedding, the source text embedding, and the set of target text embeddings in a multimodal cross lingual metric space.

13. The non-transitory computer readable medium of claim 11, wherein:
- extracting the image embedding comprises utilizing the image encoder to generate a real-valued feature vector from the digital image;
- extracting the source text embedding comprises utilizing the multimodal model to generate a real-valued feature vector from the source tag; and
- extracting the set of target text embeddings comprises utilizing the multimodal model to generate a real-valued feature vector from the set of target tags.

14. The non-transitory computer readable medium of claim 11, wherein the set of target tags comprises a vocabulary of tags that are available in the target language.

15. The non-transitory computer readable medium of claim 11, wherein selecting the appropriate target tag comprises:
- calculating, for each target tag in the set of target tags, a weighted sum of a first similarity score from the first set of similarity scores and a second similarity score from the second set of similarity scores; and
- selecting a target tag with a highest weighted sum as the appropriate target tag.

16. A system comprising:
- one or more memory devices comprising a digital image and a set of target tags in a target language; and
- one or more processors configured to cause the system to:
  - obtain a source tag in a source language for an object located in the digital image;
  - determine that the source tag is to be translated from the source language into the target language;
  - extract:
    - an image embedding from the digital image using an image encoder;
    - a source text embedding from the source tag in the source language using a multimodal model; and
    - a set of target text embeddings from a set of target tags in the target language using the multimodal model;
  - generate a first set of similarity scores representing measures of similarity between the digital image and each target tag in the set of target tags by comparing the image embedding with each of the target text embeddings in the set of target text embeddings;
  - generate a second set of similarity scores representing measures of similarity between the source tag and the set of target tags by comparing the source text embedding and each of the target text embeddings in the set of target text embeddings; and
  - select, from the set of target tags, an appropriate target tag as a translation of the source tag by combining the first set of similarity scores and the second set of similarity scores.

17. The system of claim 16, wherein the one or more processors are further configured to select the appropriate target tag by:
- determining a mapping between the source tag and a target tag in the set of target tags by calculating, for the target tag, a weighted sum of an identity function and similarity scores in the first set of similarity scores and the second set of similarity scores corresponding to the target tag; and
- selecting the target tag as the appropriate target tag based on the mapping.

18. The system of claim 16, wherein the object is one of multiple objects in the digital image, and wherein each of the multiple objects is associated with a different source tag to be translated into the target language.

19. The system of claim 16, wherein the one or more processors are further configured to select the appropriate target tag by:

determining a first target tag from the set of target tags identified as a translation for another source tag associated with another object within the digital image; and based on identifying the first target tag as the translation for another source tag, selecting a second target tag from the set of target tags as the appropriate target tag.

20. The system of claim 16, wherein the one or more processors are further configured to obtain the source tag by:

applying a tagging model to the digital image that generates the source tag from the object located in the digital image.

\* \* \* \* \*